US005643466A

United States Patent [19]

Strapp

[11] Patent Number: 5,643,466

[45] Date of Patent: Jul. 1, 1997

[54] TREATMENT OF LIQUIDS

[75] Inventor: Malcolm Strapp, Flint, England

[73] Assignee: Gosvenor Power Services Limited, Manchester, Great Britain

[21] Appl. No.: 313,259

[22] PCT Filed: Apr. 1, 1993

[86] PCT No.: PCT/GB93/00685

§ 371 Date: Nov. 28, 1994

§ 102(e) Date: Nov. 28, 1994

[87] PCT Pub. No.: WO93/19812

PCT Pub. Date: Oct. 14, 1993

[30] Foreign Application Priority Data

Apr. 2, 1992 [GB] United Kingdom .................... 9207236

[51] Int. Cl.[6] .................................................. B01D 57/00

[52] U.S. Cl. ........................................ 210/763; 210/909

[58] Field of Search .................................. 210/757, 762, 210/763, 766, 909; 588/207

[56] References Cited

U.S. PATENT DOCUMENTS

| | | | |
|---|---|---|---|
| 4,161,609 | 7/1979 | Cramer | 560/215 |
| 4,351,978 | 9/1982 | Hatano et al. | 210/909 |
| 4,612,404 | 9/1986 | Thyagarajan | 568/730 |
| 4,618,686 | 10/1986 | Boyer | 210/909 |
| 4,623,448 | 11/1986 | O'Connell et al. | 208/262 |
| 4,859,692 | 8/1989 | Bernstein et al. | 514/381 |
| 4,931,167 | 6/1990 | Wilwerding | 210/909 |
| 5,045,179 | 9/1991 | Langhoff et al. | 210/909 |

FOREIGN PATENT DOCUMENTS

| | | | |
|---|---|---|---|
| 0 012 162 | 6/1980 | European Pat. Off. | C02F 1/70 |
| 40 13 340 | 10/1991 | Germany | A62D 3/00 |
| WO88/02268 | 4/1988 | WIPO . | |

OTHER PUBLICATIONS

Database WPIL, Derwent Publications Ltd., AN 85–046957 & JP 600 004 589 (Mitsubishi Heavy Ind.) 11 Jan. 1985.

*Primary Examiner*—Ivars Cintins
*Attorney, Agent, or Firm*—Seidel, Gonda, Lavorgna & Monaco, PC

[57] ABSTRACT

A process for decontaminating oils and synthetic liquids containing polychlorobiphenyls comprising passing the liquid through a catalytic bed at an elevated temperature. The catalytic bed comprises a carrier and one or more active metal compounds selected from the group consisting of compounds of nickel, copper, molybdenum, tungsten, and chromium.

15 Claims, No Drawings

TREATMENT OF LIQUIDS

DESCRIPTION

This invention concerns treatment of liquids such as, for example, oils, in order to remove contaminants such as, for example, polychlorobiphenyls (PCB's).

PCB's, have been found to be undesirable contaminants of liquids as they are non-biodegradable. The most effective treatment of PCB contaminated liquids, such as electrical oils, is incineration. However, in order to conserve such oils, their re-use is allowable when PCB contamination is below 10 ppm. Thus, methods have been devised for removing PCB's from oils. One method is to use sodium metal, which is both dangerous and expensive. Because sodium is highly reactive special plant is required for this method. Another method is catalysed treatment with hydrogen at high pressure. Again special plant is required to cope with the high pressures and hence this method is also expensive.

An object of this invention is to provide a method of removing PCB's from liquids without the need for hydrogen under pressure.

According to this invention there is provided a process for removal of contaminants from a liquid comprising passing the liquid through a catalytic bed at an elevated temperature.

Typically the process of the invention will be used for removing organic halides, such as PCB's from oils and synthetic liquids. Examples of oils include electrical oils, heat transfer oils, hydraulic oils, fuel oils and process oils. Examples of synthetic liquids include esters and various polymers used as electrical, hydraulic and heat transfer liquids.

The catalytic bed preferably comprises a carrier and one or more active metal compounds. Preferred metal compounds include oxides, hydroxides and sulphides. Preferred metals include nickel, iron, copper, molybdenum, tungsten and chromium. Preferably a nickel compound will always be present either alone or in combination with one or more other metal compounds.

Suitable carriers for the active metal compounds are those having a relatively high surface area. Carriers that may be re-used as fuels are one type that may be suitable for use in the invention, such as carbon based carriers, for example charcoal and coke. Other suitable carriers may be of a type that can be regenerated by burning off collected residues. Examples of that type of carrier include clays, alumina, silica and bauxite.

Thus, exhausted catalytic mass may be regenerated in the case of non-carbon based carriers by controlled burning off of deactivating residues. Carbon based catalytic mass may be disposed of as solid fuel. In both cases process liquid is preferably monitored to prevent contamination surviving the process and contaminating the carrier mass. Prior to regeneration or disposal by burning, the catalytic mass may be purged with non-contaminated liquid to prevent halogenated material being present during combustion conditions.

The catalytic bed may be prepared in any convenient way. A preferred way is to precipitate metal as hydroxide or carbonate onto the carrier material from an aqueous solution of metal salt by the addition of alkali.

The temperature of the catalytic bed may be as high as is desirable but not so high that significant degradation of the liquid under treatment is likely. Typically temperatures in the range of 275° to 375° C., especially in the range of 275° to 325° C., may be used for the process of the invention. The temperature of the catalytic bed may also be increased to compensate for decreased catalytic activity or in order to process liquids with higher levels of contamination. The amount of metal catalyst present in the catalytic bed may be anything above 0% upto about 100% by weight of the carrier. Preferably metal catalyst is present in amount of from 0.5 to 15% by weight of the carrier. The amount of metal catalyst used may depend on one or more of various factors. Higher amounts of catalyst may give longer catalytic life and enhanced ability to process highly contaminated liquids. On the other hand lower levels of catalyst may facilitate disposal of exhausted catalytic mass.

It is believed that pressure is not required to promote chemical reaction but may be required to maintain flow rate of the liquid under treatment through the catalytic bed. For liquids containing higher levels of contaminant relatively a slow flow rate through the catalytic bed may be advisable. The same may apply to liquids being passed through a catalytic bed of lower activity. On the other hand flow rates upto eight bed volumes per hour may be suitable for liquids with lower levels of contamination or for catalytic beds of higher activity.

For some liquids the process of the invention may be used to decontaminate liquids so that they are suitable for standard reclamation procedures before re-use for their original purposes. On the other hand highly contaminated liquids may require such severe treatment that the resultant decontaminated liquid is not suitable for re-use but may be used as fuel oil.

It is believed that the mechanism for the catalytic treatment of liquids, such as hydrocarbons, by the process of the invention may involve activation of chlorine atoms in the PCB's which react with the hydrocarbons to produce HCl. Thus, there may be a small amount of cracking of hydrocarbon in the process. Any HCl produced by the process of the invention may be neutralised by passing the HCl through alkali. Non-chlorinated biphenyls produced are relatively harmless.

This invention will now be further described by means of the following Example.

EXAMPLE

In order to remove PCB's from electrical oil containing less than 50 ppm of PCB's, the oil was passed through a catalytic mass comprising bauxite granules impregnated with nickel oxide. The catalytic mass was prepared by precipitation of nickel hydroxide or carbonate onto the bauxite granules by addition of alkali to the bauxite previously soaked with a solution of a nickel salt. The amount of nickel oxide in the catalytic mass was in the range 0.5 to 15% by weight of the bauxite.

The catalytic mass was heated to a temperature of 275° to 325° C. and pressure applied to the oil only sufficiently to maintain a desired flow rate.

The resultant oil had a PCB level well below an acceptable level of 10 ppm and so could be reused after other standard decontamination procedures.

I claim:

1. A process for the removal of polychlorobiphenyls from a liquid comprising the step of passing the liquid through a catalytic bed at an elevated temperature wherein the catalytic bed comprises a carrier and one or more active metal compounds selected from the group consisting of compounds of nickel, copper, molybdenum, tungsten and chromium, the bed being prepared by precipitating the metal as a hydroxide or carbonate onto the carrier material from an aqueous solution of metal salt by addition of alkali.

2. A process as claimed in claim 1, wherein the liquid is selected from the group consisting of oils and synthetic liquids.

3. A process as claimed in claim 2, wherein the synthetic liquid is selected from the group consisting of esters and polymers used as electrical, hydraulic and heat transfer liquids.

4. A process as claimed in claim 1, wherein the active metal compound is of nickel alone or in combination with one or more other metal compounds.

5. A process as claimed in claim 1, wherein the carrier has a high surface area.

6. A process as claimed in claim 5, wherein the carrier is reusable as a fuel.

7. A process as claimed in claim 6, wherein the carrier is selected from the group consisting of charcoal and coke.

8. A process as claimed in claim 5, wherein the carrier is regenerated by burning off collected residues.

9. A process as claimed in claim 8, wherein the carrier is selected from the group consisting of clays, alumina, silica and bauxite.

10. A process as claimed in claim 8 or 9 including the step of regenerating the catalytic bed, once exhausted, by burning off collected residues.

11. A process as claimed in claim 10, including the step of purging the catalytic bed with non-contaminated liquid prior to the step of regeneration.

12. A process as claimed in claim 1, wherein the temperature of the catalytic bed is in the range of 275 to 375 degrees centigrade.

13. A process as claimed in claim 12, wherein the temperature of the catalytic bed is in the range of 275 to 325 degrees centigrade.

14. A process as claimed in claim 1, wherein the metal is present in an amount of from 0.5 to 15% by weight of the carrier.

15. A process as claimed in claim 1, wherein the liquid under treatment is passed through the catalytic bed at a rate of up to eight bed volumes per hour.

* * * * *